United States Patent [19]
Nett

[11] Patent Number: 6,042,173
[45] Date of Patent: *Mar. 28, 2000

[54] HARD SHELL TONNEAU COVER

[75] Inventor: James A. Nett, Oklahoma City, Okla.

[73] Assignee: Covercraft Industries, Inc., Pauls Valley, Okla.

[ * ] Notice: This patent is subject to a terminal disclaimer.

[21] Appl. No.: 09/066,522

[22] Filed: Apr. 24, 1998

Related U.S. Application Data

[63] Continuation-in-part of application No. 08/796,245, Feb. 6, 1997, Pat. No. 5,743,586.

[51] Int. Cl.⁷ .................................................. B60P 7/02
[52] U.S. Cl. ............................................... 296/100.06
[58] Field of Search ..................... 296/100.02, 100.06

[56] References Cited

U.S. PATENT DOCUMENTS

| | | | |
|---|---|---|---|
| 5,213,390 | 5/1993 | Borchers | 296/100.06 |
| 5,340,188 | 8/1994 | Goble | 296/100.06 |
| 5,632,522 | 5/1997 | Gaitan et al. | 296/100.06 |
| 5,743,586 | 4/1998 | Nett | 296/100.02 |

Primary Examiner—Gary C. Hoge
Attorney, Agent, or Firm—Pillsbury Madison & Sutro LLP

[57] ABSTRACT

A tonneau cover for a pickup truck is provided with a generally rigid panel structure composed of a sheet of polystyrene foam, between two relatively thin sheets of a generally rigid fiberglass or other composite material. A sheet of padding material and a sheet of protective plastic or vinyl, are disposed on one of the two rigid sheets. A side bracket is secured to each side of the layered sheet panel structure. Each side bracket includes a generally "C"-shaped channel for receiving an edge of the panel structure. Each side bracket also defines a generally "L"-shaped bracket portion for receiving and securing, by snap-fit engagement, a side molding piece. A corner bracket is secured to each of two perpendicular side brackets at each corner of the panel structure. The corner bracket includes a receptacle for receiving and securing a corner molding piece thereto. Latches and struts secure the cover to the interior surfaces of the truck side walls, such that no latches or other attaching mechanisms are visible from the exterior of the truck. The cover does not attach to or interfere with the operation of the truck tailgate, such that the tailgate may be opened or closed, while the cover is in a closed position on the truck bed. A hinge is provided for moving the cover between closed and open positions. A sealing system, including side ledges and sealing pieces, is also provided for sealing the bed against environmental elements.

9 Claims, 11 Drawing Sheets

HARD SHELL TONNEAU COVER

RELATED APPLICATIONS

This application is a continuation-in-part of U.S. patent application Ser. No. 08/796,245, filed Feb. 6, 1997 now U.S. Pat. No. 5,743,586.

BACKGROUND OF THE INVENTION

1. Field of the Invention:

The present invention relates to apparatus and processes for covering the bed of a pickup truck, other vehicle, or the like, and, in particular embodiments, to apparatus and processes for providing a generally rigid, padded cover extending over the bed of a pickup truck, including a mechanism or step for supporting the cover in an open position. The present invention also relates to a hinge for moving the cover between closed and open positions and to a sealing system for providing the bed with a seal against environmental elements.

2. Description of Related Art:

Modern pickup trucks are typically provided with open bed areas bordered by the side walls, front wall (or cab wall), and tailgate of the truck bed. An example of a conventional pickup truck is shown in FIG. 1 and includes an open bed 10 bordered on two sides by side walls 12 and 14, on the front side by a front wall 16 (which, in some trucks, is the rear cab wall), and on the rear side by a rear wall or tailgate 18. The interior 20 of the bed 10 in FIG. 1 is open to the environment from the top of the bed.

The open top of the bed tends to affect the relative air flow over the vehicle at typical driving speeds and tends to cause adverse aerodynamic (drag) effects. In addition, the open bed can tend to inadequately protect items stored in the bed from exposure to environmental elements, from being jarred out of the bed, and from potential theft. In addition, the open interior of the bed can be aesthetically displeasing, especially if the interior is used as a work/storage space and prone to dents and scratches during use.

As a result, a popular practice among modern pickup truck owners is to cover the bed of the pickup truck with a covering material. One typical approach is to cover the interior of the truck bed with a flexible fabric, which is tied down to the side walls, front wall, and tailgate of the truck bed. However, this approach typically requires tie mechanisms to be positioned on all walls and the tailgate of the truck and can be cumbersome and time-consuming to operate, thus making it relatively inconvenient to access the interior of the truck bed once the fabric is tied down over the bed. In addition, the tie down mechanisms can be aesthetically displeasing and can also adversely affect the air-resistance characteristics of the vehicle.

Another approach is to cover the interior of the truck bed with a rigid panel, which is attached to the side walls of the truck bed using pins. However, this approach provides no support for the cover along the front wall of the truck bed and allows the cover to dip below the top plane of the truck bed when the cover is in an open position. Thus, this approach provides no seal against environmental elements along the front wall of the truck bed. Additionally, debris that accumulates on top of the cover tends to fall into the interior of the truck bed. Furthermore, this approach does not provide a seal against environmental elements along the side walls and the tailgate of the truck bed.

SUMMARY OF THE DISCLOSURE

Accordingly, it is an object of the present invention to provide an improved apparatus and improved processes for covering the bed of a pickup truck, which minimize some or all of the above-noted deficiencies of prior cover designs. Further embodiments of the present invention are applicable as covers for other vehicles or the like.

According to preferred embodiments, a tonneau cover for a pickup truck is provided with a generally rigid panel structure composed of a sheet of lightweight material, such as polystyrene foam, between two relatively thin sheets of a generally rigid material, such as fiberglass or other composite material. A sheet of padding material and a sheet of protective material, such as plastic or vinyl, are disposed on one of the two rigid sheets.

In accordance with a first embodiment of the present invention, a side bracket is secured to each side of the layered sheet panel structure. Each side bracket includes a generally "C"-shaped channel for receiving an edge of the panel structure. Each side bracket also defines a generally "L"-shaped bracket portion for receiving and securing, by snap-fit engagement, a side molding piece. A corner bracket is secured to each of two perpendicular side brackets at each corner of the panel structure. The corner bracket includes a receptacle for receiving and securing a corner molding piece thereto. The corner bracket and the side brackets are concealed behind the side and corner molding pieces, upon the molding pieces being secured to the brackets. The side molding pieces preferably extend below the bottom surface of the side bracket, so as to provide an aesthetically pleasing transition between the cover and the truck bed side walls, for a variety of side wall tapering angles.

Latches and struts preferably secure the cover to the interior surfaces of the truck side walls, such that no latches or other attaching mechanisms are visible from the exterior of the truck. Preferably, the cover does not attach to or interfere with the operation of the truck tailgate, such that the tailgate may be opened or closed, while the cover is in a closed position on the truck bed.

In accordance with second and third embodiments of the present invention, a hinge is provided between the front side edge of the cover and the front wall of the truck bed. The hinge is used to move the cover between the closed position and the open position and to support the cover in the open position at about the top plane of the truck bed. A sealing system, including side ledges, side brackets, and sealing pieces, is also provided along the side walls and the tailgate of the truck bed to seal the interior of the truck bed against environmental elements.

Other features and advantages of the invention will become apparent from the following detailed description, taken in conjunction with the accompanying drawings, which illustrate, by way of example, various features of embodiments of the invention.

BRIEF DESCRIPTION OF THE DRAWINGS

A detailed description of embodiments of the invention will be made with reference to the accompanying drawings, wherein like numerals designate corresponding parts in the several figures.

DETAILED DESCRIPTION OF THE PREFERRED EMBODIMENTS

Preferred embodiments of a tonneau cover according to the present invention are shown with respect to FIGS. 2–15b. While preferred embodiments (including the illustrated embodiments) of the present invention are designed as covers for pickup truck beds, it will be readily understood that aspects of the invention (and further embodiments of the invention) are applicable and include covers for other vehicles and the like. However, for purposes of simplifying the present disclosure, aspects of the invention are discussed and illustrated herein with respect to a cover for the bed of a pickup truck.

Figure 2:
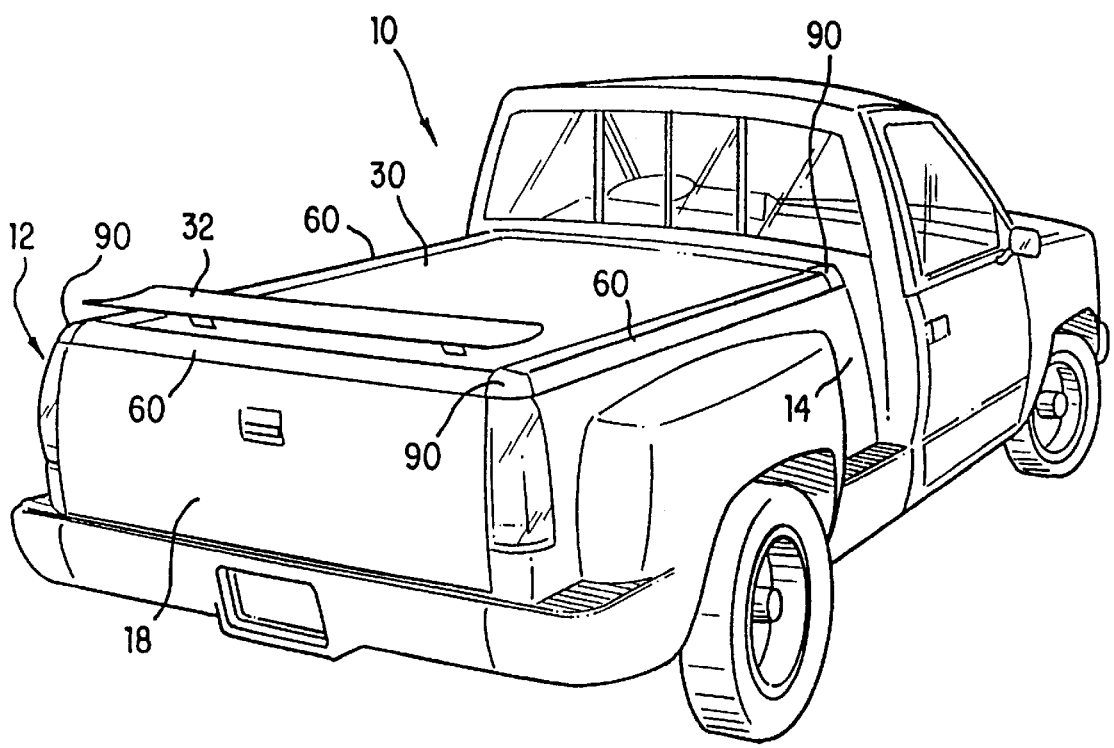
FIG. 2 is a perspective view of a conventional pickup truck, but with a cover, according to a first embodiment of the present invention, disposed over the truck bed in a closed position.

With respect to FIG. 2, a cover 30 is shown as being supported over the bed 10 of a pickup truck. The cover 30 shown in FIG. 2 is provided with a spoiler 32 for aesthetic and aerodynamic purposes. However, other embodiments may be provided without a spoiler.

The cover 30 is shaped, generally, as a relatively rigid, rectangular plate having a length and width slightly larger than the length and width of the interior 20 of the bed 10, such that the cover 30 rests on the upper surfaces of the side walls 12 and 14 of the bed 10 when placed over the interior 20 of the bed 10. In preferred embodiments, the cover 30 is moveable between a closed position as shown in FIG. 2 (in which the cover 30 closes the otherwise open top of the bed) and an open position as shown in FIG. 3 (in which the cover 30 is supported in an inclined position relative to the plane of the top of the bed 10, so as to expose the interior 20 of the bed 10).

Figure 3:
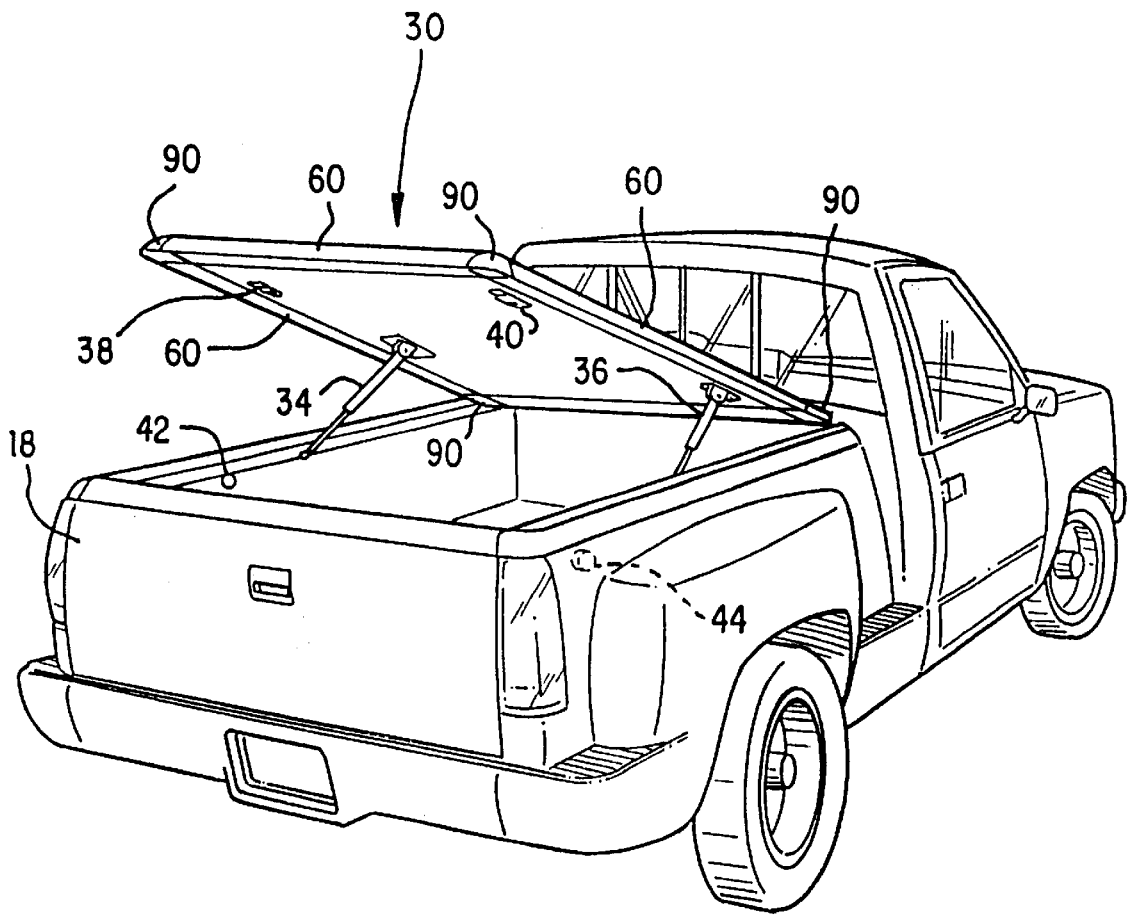
FIG. 3 is a perspective view of the pickup truck and cover of FIG. 2, but with the cover disposed over the truck bed in an open position.

In accordance with a first embodiment of the present invention, the cover 30 is provided with at least one support mechanism for supporting the cover 30 in the inclined or open position shown in FIG. 3. Hinges (not shown) may be provided between the front edge of the cover 30 (the edge facing the truck cab) and the front wall 16 of the truck bed 10. Alternatively, hinges may be omitted and the pivotal action of the cover may be controlled by the support mechanisms. In the illustrated embodiment, the support mechanism comprises a pair of pneumatic struts 34 and 36, which are each coupled at one end to the interior surface of a side wall 12 or 14 and at the other end to the cover 30. In further embodiments, other suitable support mechanisms, including but not limited to manually operable brackets or rods, may be employed as an alternative to the pneumatic struts. In yet further embodiments, support mechanisms for supporting the cover 30 in the open position are omitted.

The cover 30 is also provided with at least one latching mechanism for latching the cover 30 to the truck bed 10 in the closed position. In the illustrated embodiment, the latching mechanism comprises a pair of latches 38 and 40 that respectively engage a corresponding pair of latch engaging members 42 and 44. Any suitable known latch devices may be used for latches 38 and 40. The latch engaging members may be brackets, apertures, or indentations in the side walls 12 and 14 of the truck bed 10, depending upon the type of latch devices used on the cover 30. Preferably, the latches 38 and 40 are manually operable and are located on the cover 30 near (e.g., within arms reach of) the rear of the pickup truck. Also preferably, the latch engaging members 42 and 44 are located on the interior surface of the side walls 12 and 14 of the bed 10. In this arrangement, the tailgate 18 of the truck may be opened, and the user may reach through the opened tailgate 18 into the interior 20 of the truck bed 10 to manually operate the latches 38 and 40 to engage or disengage the latch engaging members 42 and 44. Once the latches 38 and 40 are manually engaged or disengaged, the tailgate 18 of the truck may be closed.

The structure of the cover 30 is preferably designed to provide the necessary rigidity to maintain its shape when supported in the inclined or open position, as shown in FIG. 3. It is also preferred that the structure of the cover 30 be designed to readily accommodate various sizes and styles of truck beds. It is further preferred that the structure of the cover 30 be designed to provide sufficient durability and strength and yet be aesthetically pleasing. A portion of a preferred cover structure for addressing these and other preferences is shown in cross-section in FIG. 4 and in an exploded view of FIG. 5.

Figure 4:
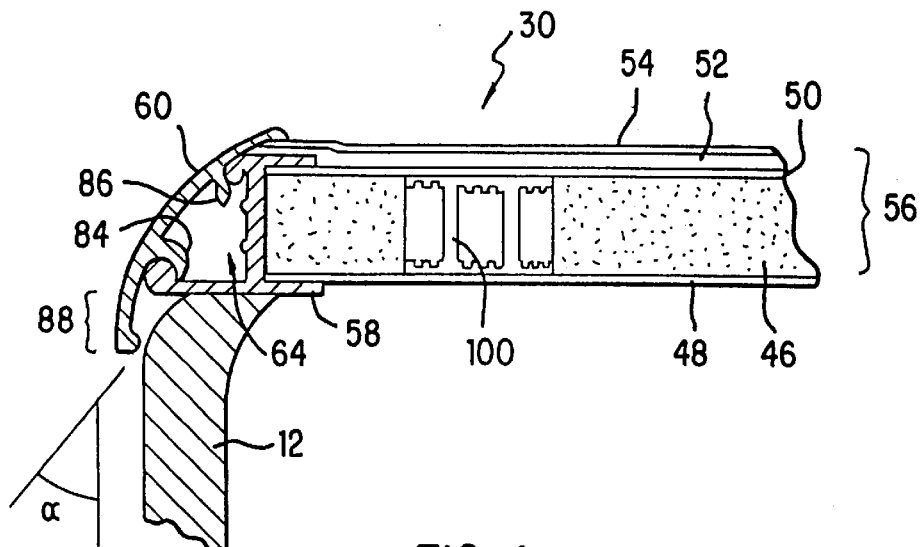
FIG. 4 is a cross-section view of a portion of the cover of FIGS. 2 and 3.
Figure 5:
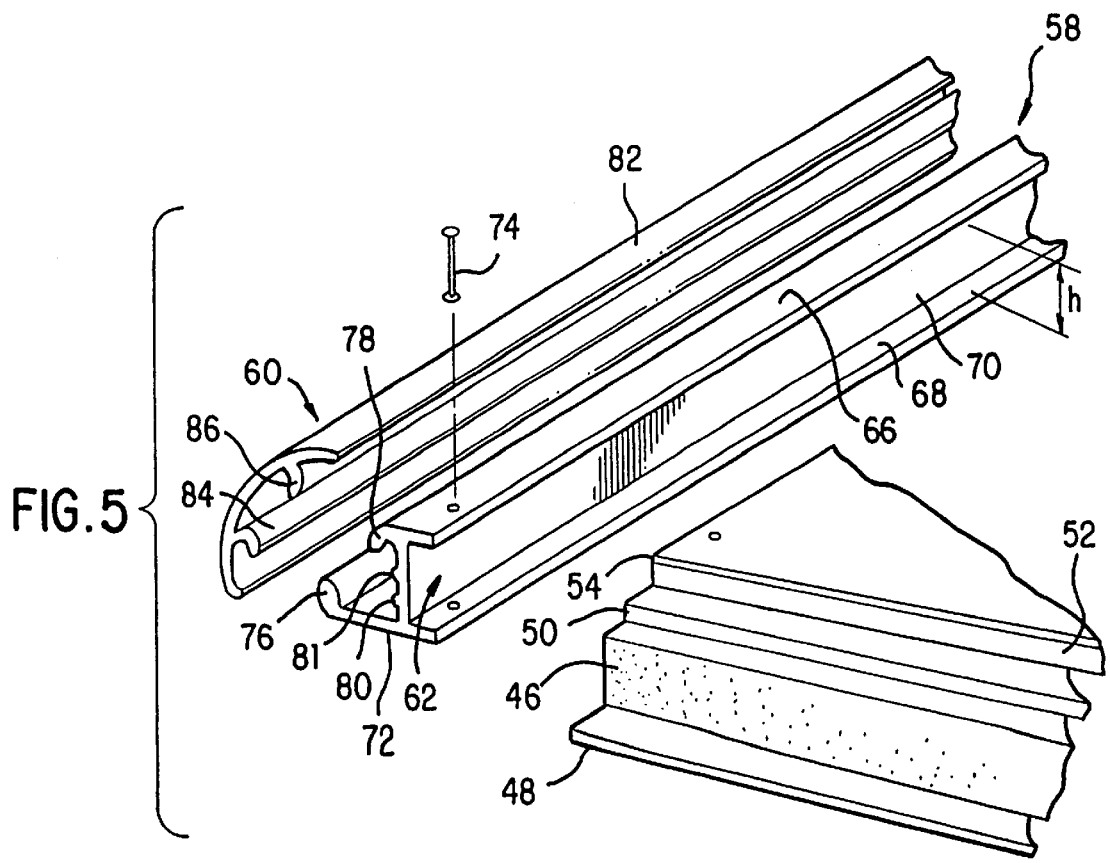
FIG. 5 is an exploded perspective view of a portion of the cover of FIGS. 2–4.

With reference to FIGS. 4 and 5, the illustrated cover 30 includes a sheet 46 of lightweight, rigid material, such as a polystyrene plastic foam material of suitable thickness. In a preferred embodiment, the sheet 46 is an approximately one inch thick sheet of polystyrene plastic foam. However, other suitable thicknesses and materials may be employed without departing from the invention. In preferred embodiments, the sheet 46 of lightweight material is sandwiched between two thin sheets 48 and 50 of rigid material, such as plastic, fiberglass, other composite material, or metal, for added strength. Preferably, the sheets 48 and 50 are adhered by a suitable adhesive to the planar surfaces of the sheet 46 to form a layered sheet structure.

A sheet 52 of padding material, such as a soft polyurethane foam material, is disposed on the rigid sheet 50 and is preferably adhered thereto at least in the central regions of the sheets. The padding sheet 52 is covered by a protective layer 54, preferably formed with an aesthetically pleasing contour and color. In preferred embodiments, the protective layer 54 is formed as a sheet of waterproof, durable material, such as vinyl or other suitable plastic, adhered to one surface of the padding sheet 52. The resulting layered structure defines a lightweight panel 56 having suitable rigidity and strength to maintain its shape in the inclined or open position and having an aesthetically pleasing, padded upper surface.

The side edges of the layered sheet structure (or panel 56) are provided with edge brackets 58, which function to help maintain the layered sheets together (and minimize separation at the edges) and which also function to retain side molding pieces 60. Preferably, the brackets 58 are formed of an extruded aluminum or aluminum alloy material, although other suitable materials and manufacturing processes may be used. In the illustrated embodiment, the cross-section shape of each bracket 58 defines a "C"-shaped channel 62 disposed back-to-back with a generally "L"-shaped bracket portion 64. The "C"-shaped channel 62 is defined by upper and lower legs 66 and 68, respectively, and a central beam 70 (which also forms one of the legs of the "L"-shaped bracket portion). The "L"-shaped bracket portion 64 is defined by a vertical leg (defined as the central beam 70) and a horizontal leg 72.

The height h of the "C"-shaped channel 62 is defined as the distance between the upper and lower legs 66 and 68, which is approximately equal to the combined thickness of the lightweight sheet 46 and the two rigid sheets 48 and 50. In this manner, the side edges of the layered sheets 46, 48, and 50 are disposed within the "C"-shaped channel 62 as shown in FIG. 4. Rivets 74 or other suitable securing means (including, but not limited to bolts, screws, adhesives, or the like) are provided to secure the legs 66 and 68 to the layered sheets 46, 48, and 50. In this manner, the heads of the rivets 74 (or the heads of threaded connectors) are disposed on the legs 66 and 68, while the shafts of the rivets 74 (or other connectors) extend through the layered sheets 46, 48, and 50 to help maintain the layered sheets 46, 48, and 50 together, without the risk of the heads of the rivets 74 (or other connectors) breaking through one or more of the layered sheets 46, 48, and 50.

Preferably, the side edges of the padding sheet 52 and the protective layer 54 are disposed above and overlap the upper leg 66 of the "C"-shaped channel 62, as shown in FIG. 4. This helps hide the bracket 58 from view, as well as helps to protect the bracket 58 from environmental elements.

The "L"-shaped bracket portion 64 defines a lengthwise, rounded extension 76 on the free end of the horizontal leg 72. A second lengthwise extension 78 is provided on the free end of the vertical leg (central beam 70) of the "L"-shaped bracket portion 64. As discussed in more detail below, these extensions 76 and 78 mate with lengthwise extensions 84 and 86 on a side molding piece 60 in a snap-fitting manner, so as to secure the side molding piece 60 to the bracket 58.

The vertical leg (central beam 70) of the "L"-shaped bracket portion 64 also defines a pair of parallel, lengthwise, extended protrusions 80 and 81 and define a channel therebetween. As discussed in more detail below, the protrusions 80 and 81 and the channel therebetween help to align a corner bracket 94 at each corner of the cover 30.

Preferably, each of the four side edges of the panel structure 56 are provided with a bracket 58. In addition, a side molding piece 60 is secured along the length of each bracket 58. In particular, each side molding piece 60 is formed of an extruded aluminum or aluminum alloy material. However, other materials (including other metals, plastics, or the like) and other manufacturing processes may be used as an alternative.

In the illustrated embodiment, each side molding piece 60 has a smooth, curved panel 82, which defines a convex surface and a concave surface. A pair of lengthwise extensions 84 and 86 extend from the concave surface for engagement with the lengthwise extensions 76 and 78, respectively, of a bracket 58. More specifically, the extension 84 is curved to generally mate with the curvature of the extension 76 (as best shown in FIG. 4). The extension 86 is spaced apart from the extension 84 by a distance suitable to abut and urge against the extension 78. Furthermore, the curvature of the extension 78 and a portion of the upper leg 66 adjacent the extension 78 generally mate with the concave curvature of the side molding piece 60, at the location at which the side molding piece 60 and the extension 78 and the upper leg 66 engage. By virtue of the natural spring tension of the material from which the side molding piece 60 is made, the side molding piece 60 is snap-fitted and, thereby, coupled to the bracket 58, as shown in FIG. 4.

As shown in FIG. 4, the side molding pieces 60 are preferably provided with an extended portion 88, which extends below the extension 84 and overlaps the upper portion of the bed side wall 12 or 14 when the cover 30 is in the closed position. The extended portion 88 tends to provide a smoother transition between the cover 30 and the bed side walls 12 and 14 and allows the cover 30 to be readily and aesthetically disposed on various truck makes and models having differing side wall tapering angles (generally shown as angle a in FIG. 4). In preferred embodiments, the side molding piece 60 that extends along the rear side edge of the cover 30 (i.e., the edge directly above the tailgate 18 of the truck bed 10) does not have the extended portion 88. In this manner, the side molding piece 60 does not overlap and interfere with the operation of the tailgate 18. Accordingly, the tailgate 18 of the truck bed 10 may be opened and closed, while the cover 30 remains in the closed position.

The front side edge of the cover 30 (i.e., the edge facing the truck cab) may be provided with a bracket 58 and a side molding piece 60 in the manner discussed above. The side molding piece 60 on the front side edge may or may not include the extended portion 88. Alternatively, the molding 60 and/or bracket 58 may be omitted from the front side edge.

As shown in FIGS. 2 and 3, the cover 30 includes corner molding pieces 90, which define a smooth, rounded corner between perpendicular side molding pieces 60, at the four corners of the cover 30. Preferably, the corner molding pieces 90 are each formed of a molded plastic material. However, other suitable materials (including metal) and other suitable manufacturing processes may be used to form the corner molding pieces 90. In the illustrated embodiment, the corner molding pieces 90 are each provided with a threaded shaft 92 for connection with a corner bracket 94, as shown in the partial exploded view of FIG. 6.

Figure 6:
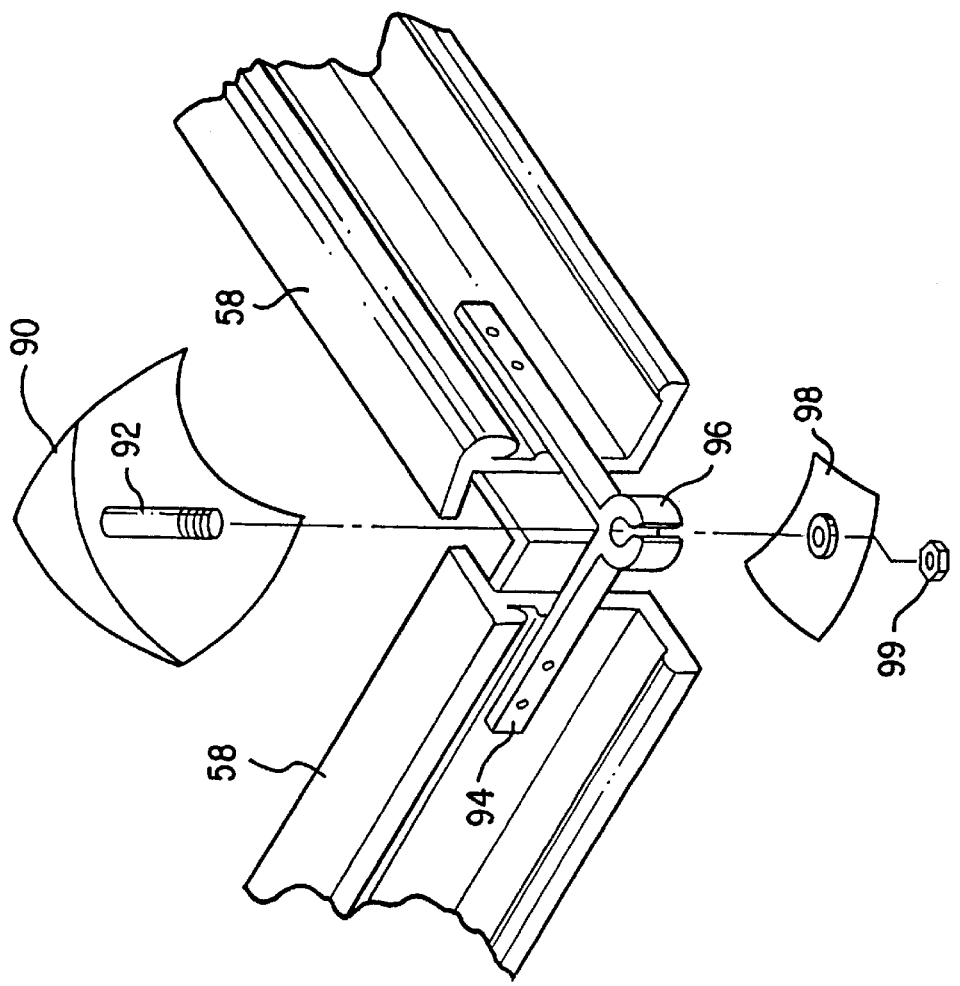
FIG. 6 is an exploded perspective view of a corner molding piece and corner bracket of the cover of FIGS. 2–5.

The corner bracket 94 shown in FIG. 6 is, generally, a "L"-shaped bracket having a "C"-shaped receptacle 96 for receiving the shaft 92 of a corner molding piece 90. A lower plate 98 and a threaded nut 99 engage and secure to the free end of the shaft 92 extending through the receptacle 96, to thereby secure the corner molding piece 90 to the corner bracket 94. Each leg of the "L"-shaped corner bracket 94 is disposed within a channel defined by the protrusions 80 and 81 of a respective bracket 58, as shown in FIG. 6. Rivets or other suitable connecting means connect the legs of the corner bracket 94 to the bracket 58. Once the side molding pieces 60 are fitted in place, the rivets or other connecting means and the legs of the corner bracket 94 are concealed behind the side molding pieces 60. The corner molding pieces 90 then conceal the rest of the corner bracket 94 and define a smooth curved molding around the periphery of the panel structure 56, as shown in FIGS. 2 and 3.

In a preferred embodiment, one or more support beams 100 are provided within the sheet of lightweight material 46 for added strength. In the illustrated embodiment, a support beam 100 is shown as a double "I"-beam, formed of an extruded aluminum or aluminum alloy material. However, other configurations, materials, and manufacturing processes may be used as an alternative. Preferably, a support beam 100 is provided at the connection location of each strut 34 and 36, so as to strengthen the connection of the struts 34 and 36 to the panel structure 56.

In accordance with a second embodiment of the present invention, the bracket 58 and the side molding piece 60 are omitted from the front side edge of the panel structure 56. A hinge 120 is provided between the front side edge of the panel structure 56 and the front wall 16 of the truck bed 10. The hinge 120 controls movement of the panel structure 56 between the closed position and the open position and supports the panel structure 56 in the open position at about the top plane of the truck bed 10. The hinge 120 also provides a seal against environmental elements along the front wall 16 of the bed 10. Additionally, a sealing system, including side ledges 140 and sealing pieces 180, is provided between the side edges of the panel structure 56 and the side walls 12 and 14 of the truck bed 10, as well as between the rear side edge of the panel structure 56 and the tailgate 18 of the bed 10. The sealing system provides a seal against environmental elements along the side walls 12 and 14 and the tailgate 18 of the truck bed 10. In alternative embodiments, the hinge 120 may be omitted, and the sealing system may also be included, between the front side edge of the panel structure 56 and the front wall 16 of the bed 10 to provide the seal against environmental elements along the front wall 16. In further alternative embodiments, the hinge 120 may be included along the front wall 16, but the sealing system may be omitted along the side walls 12 and 14 and the tailgate 18.

Figure 7:
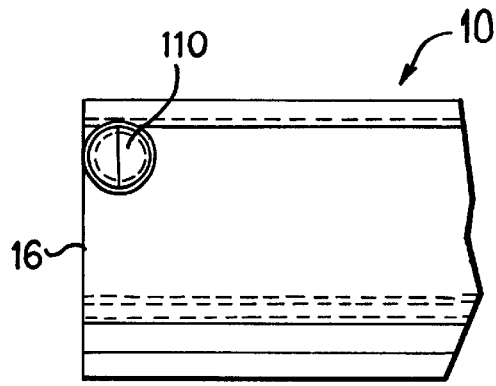
FIG. 7 is an exploded side plan view of a rail along a front wall of the truck bed in accordance with a second embodiment of the present invention.
Figure 8:
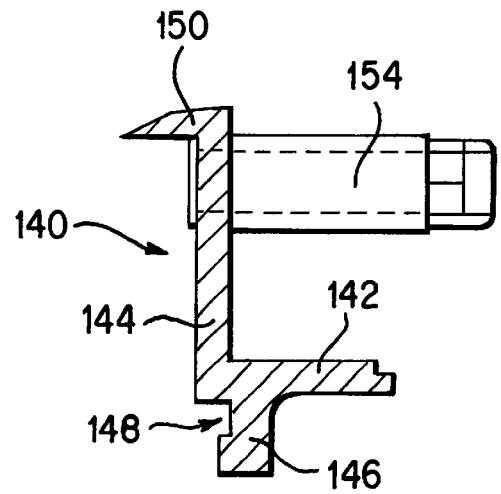
FIG. 8 is a cross-section view of a portion of a side ledge adjacent the front wall of the truck bed in accordance with a second embodiment of the present invention.

As shown in FIG. 7, a generally cylindrical rail 110 is provided along the front wall 16 of the truck bed 10. In one embodiment, the rail 110 is made of metal. However, in alternative embodiments, the rail 110 may be made of other suitable materials, such as plastic, ceramic, composites, or the like. In preferred embodiments, side ledges 140 are secured along the lengths of the side walls 12 and 14 of the truck bed 10, as discussed below. In the embodiment illustrated in FIG. 8, a bolt 154 is screwed into a portion of each side ledge 140 adjacent the front wall 16 of the truck bed 10. One end of the rail 110 is screwed into the bolt 154 in the side ledge 140 secured to side wall 12, and the other end of the rail 110 is screwed into the bolt 154 in the side ledge 140 secured to side wall 14. In alternative embodiments, the rail 110 may be secured to the side ledges 140 using screws, nails, or the like. In further alternative embodiments, the side ledges 140 may be omitted, and the rail 110 may be secured directly to the side walls 12 and 14 using bolts, screws, nails, or the like. In yet other alternative embodiments, the bolts 154 may be omitted, and the rail 110 may be screwed directly into the side ledges 140 or the side walls 12 and 14.

In preferred embodiments, a hinge 120 is disposed between the front side edge of the panel structure 56 and the front wall 16 of the truck bed 10. In one embodiment, the hinge 120 is made of aluminum. However, in alternative embodiments, the hinge 120 may be made of other suitable materials, such as other metals, plastic, ceramic, composites, or the like. In the embodiment illustrated in FIG. 10, the hinge 120 defines a generally curved, "C"-shaped socket portion 122 disposed back-to-back with a generally rectangular channel portion 124. The channel 124 is defined by upper and lower legs 126 and 128, respectively, and a central beam 130. The hinge 120 also has a trough portion 132 between the socket 122 and the channel 124.

Figure 9:
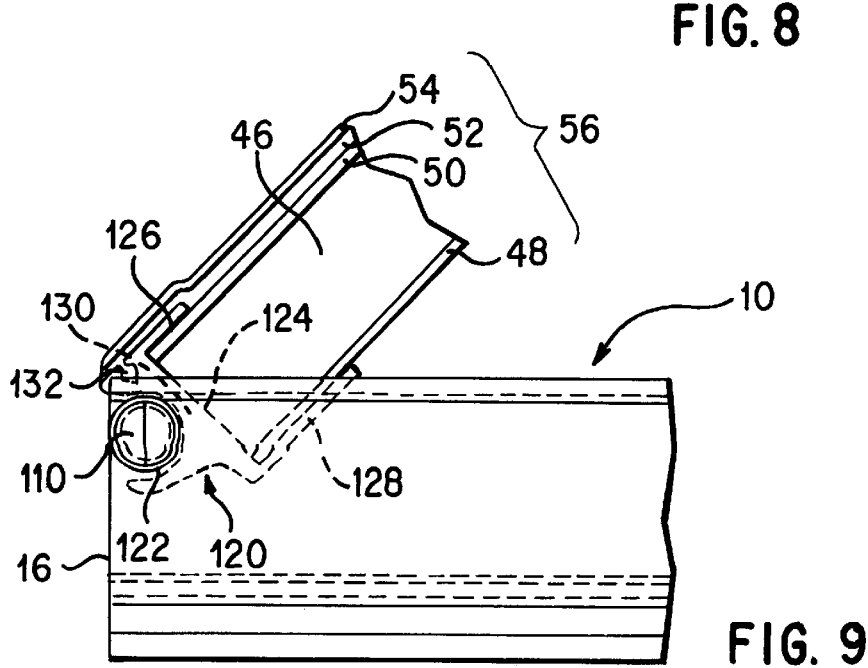
FIG. 9 is a cross-section view of a hinge between the cover and the front wall of the truck bed, with the cover disposed over the truck bed in the open position, in accordance with a second embodiment of the present invention.
Figure 10:
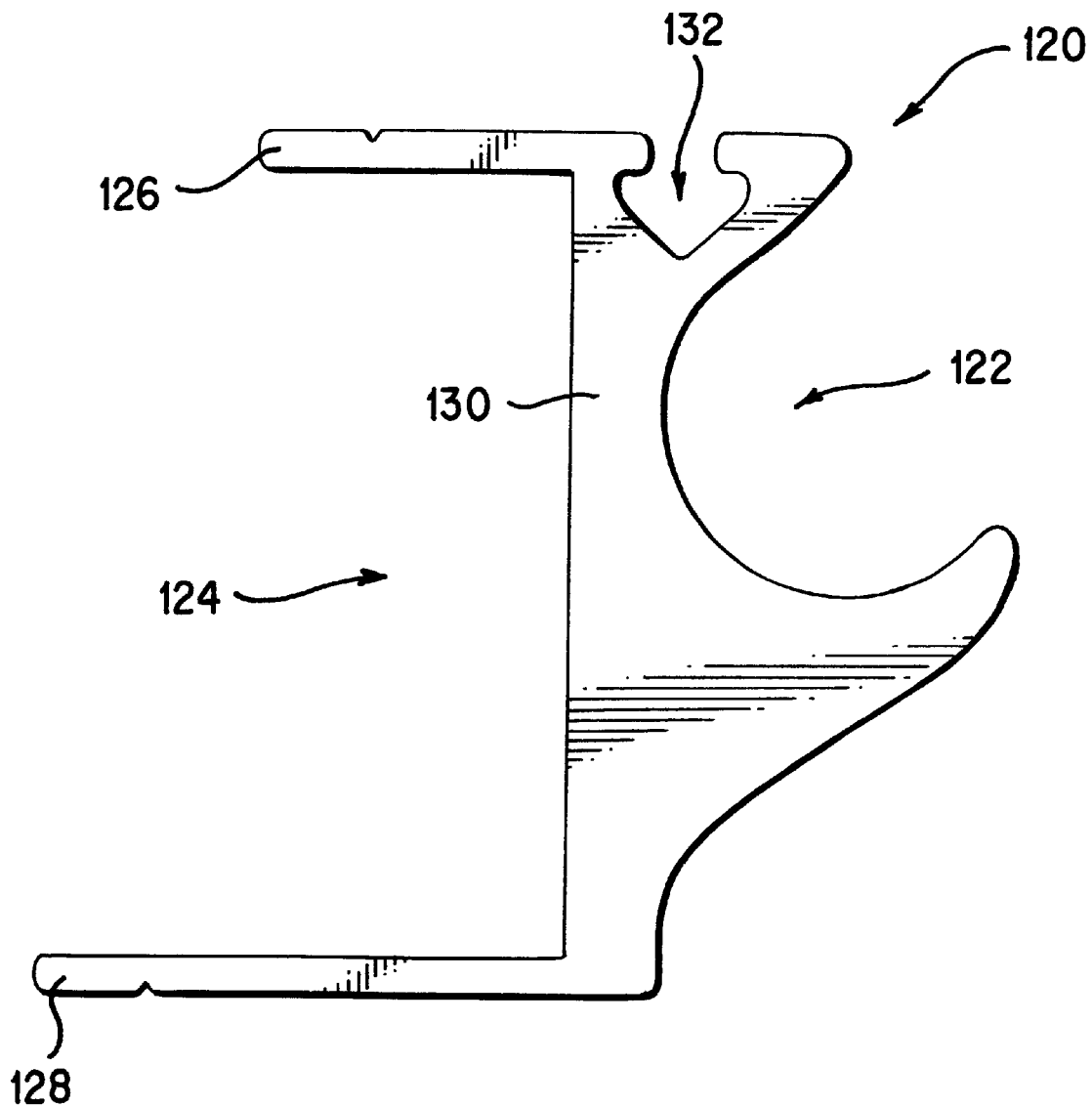
FIG. 10 is an exploded side plan view of the hinge shown in FIG. 9.

Referring to FIG. 9, the front side edges of the layered sheets 46, 48, and 50 are disposed within the channel 124 and secured to the hinge 120 using fasteners, such as rivets, screws, nails, or the like. Preferably, the front side edges of the padding sheet 52 and the protective layer 54 are disposed above and overlap the upper leg 126 of the channel 124. The front side edge of the padding sheet 52 mates with the trough 132 in a snap-fitting manner. The padding sheet 52 and the protective layer 54 thus hide the hinge 120 from view and protect the hinge 120 from environmental elements. In alternative embodiments, the trough 132 may be omitted, and the front side edges of the padding sheet 52 and the protective layer 54 may be secured to the upper leg 126 of the channel 124 using fasteners, adhesives, or the like.

The socket 122 of the hinge 120 operatively couples with and engages the rail 110 along the front wall 16 of the truck bed 10 to permit lateral and rotational displacement of the hinge 120 and the panel structure 56 in a direction perpendicular to the top plane of the truck bed 10. As the panel structure 56 is raised to the open position, the socket 122 of the hinge 120 rotates around the rail 110, and the hinge 120 and the panel structure 56 are inclined relative to the top plane of the truck bed 10. The hinge 120 thus controls movement of the panel structure 56 between the closed position and the open position. In preferred embodiments, the hinge 120 extends across the width of the front side edge of the panel structure 56. The hinge 120 also permits placement of the panel structure 56 immediately adjacent the front wall 16 of the truck bed 10. In this manner, when the panel structure 56 is in the closed position, the hinge 120 provides a seal against environmental elements along the front wall 16 of the truck bed 10. Additionally, when the panel structure 56 is in the open position, the hinge 120 substantially prevents the panel structure 56 from dipping below the top plane of the truck bed 10 and thus supports the panel structure 56 at about the top plane of the bed 10. Debris that accumulates on top of the panel structure 56 when the panel structure 56 is in the closed position generally does not fall into the interior 20 of the truck bed 10 when the panel structure 56 is raised to the open position, thus maintaining the seal along the front wall 16 of the bed 10.

Figure 12:
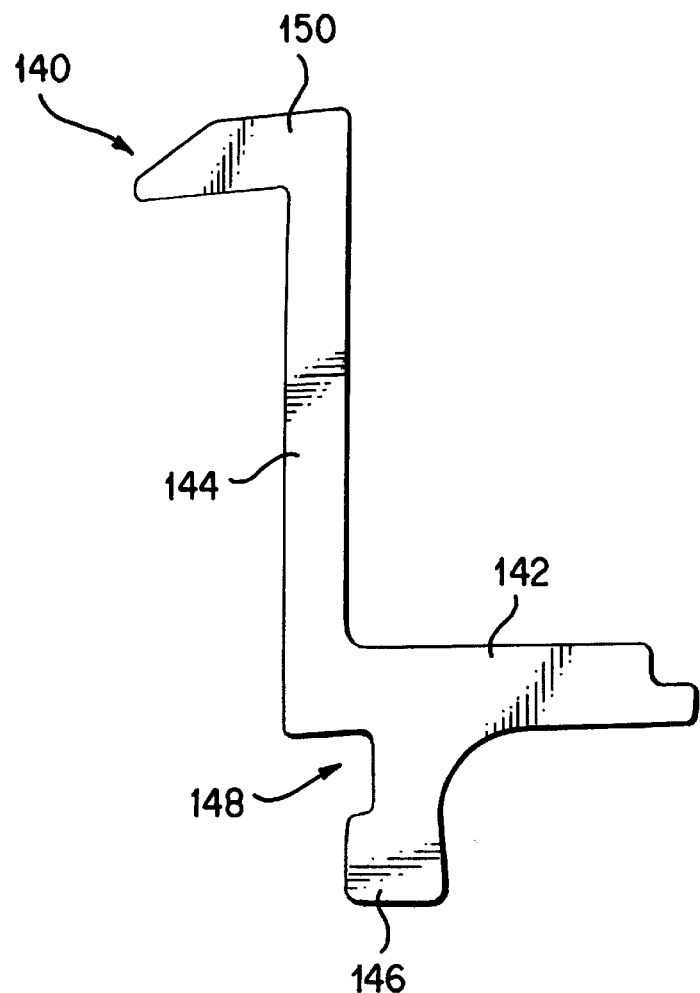
FIG. 12 is an exploded side plan view of a side ledge shown in FIGS. 11a and 11b.

In accordance with a second embodiment of the present invention, a sealing system is disposed between the side edges of the panel structure 56 and the side walls 12 and 14 of the truck bed 10, as well as between the rear side edge of the panel structure 56 and the tailgate 18 of the bed 10. The sealing system includes side ledges 140, side brackets 160, and sealing pieces 180. FIG. 12 shows a preferred embodiment of a side ledge 140. In one embodiment, the side ledge 140 is made of aluminum. However, in alternative embodiments, the side ledge 140 may be made of other suitable materials, such as other metals, plastic, ceramic, composites, or the like. In preferred embodiments, the side ledges 140 are secured along the lengths of the side walls 12 and 14. In the embodiment illustrated in FIG. 12, each side ledge 140 is defined by a horizontal leg 142, a vertical leg 144, a head portion 150 protruding from the vertical leg 144, and a foot portion 146 hanging from the horizontal leg 142. The vertical leg 144 and the foot 146 define a channel 148 therebetween, which mates with a lip (not shown) on the side wall 12 or 14 of the truck bed 10 to secure the side ledge 140 to the side wall 12 or 14. In this manner, the foot 146 of the side ledge 140 is an integral part of the side wall 12 or 14. In alternative embodiments, the side ledge 140 may be secured to the side wall 12 or 14 using fasteners, such as clamps, screws, nails, or the like.

Figure 13:
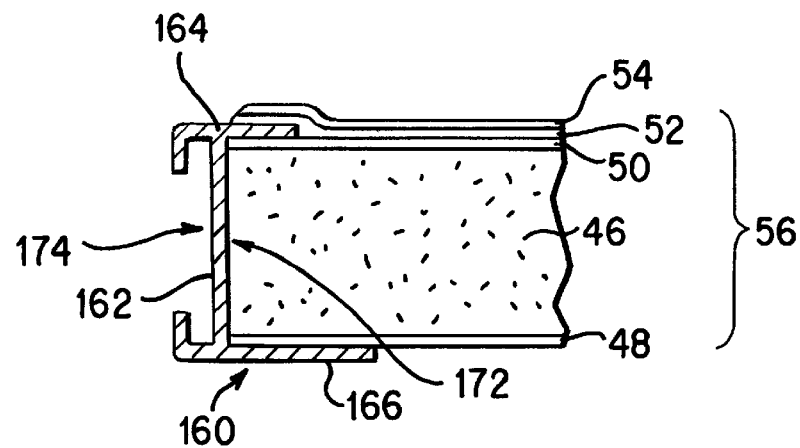
FIG. 13 is a cross-section view of a side bracket secured to the cover shown in FIGS. 11a and 11b.

FIG. 13 illustrates a cross-section view of an alternative embodiment of the side bracket 58 secured to the panel structure 56 shown in FIGS. 4–6. In preferred embodiments, the side brackets 160 extend along the lengths of the side edges and the rear side edge of the panel structure 56. In the illustrated embodiment, each bracket 160 has upper and lower legs 164 and 166, respectively, and a central beam 162, which define a generally rectangular channel portion 172 disposed back-to-back with a generally "C"-shaped bracket portion 174. The side edges of the layered sheets 46, 48, and 50 are disposed within the channel 172 and secured to the bracket 160 using fasteners, such as rivets, screws, nails, or the like. The side edges of the padding sheet 52 and the protective layer 54 are disposed above and partially overlap the upper leg 164 of the bracket 160. The padding sheet 52 and the protective layer 54 thus partially hide the bracket 160 from view and protect the bracket 160 from environmental elements.

Figure 14:
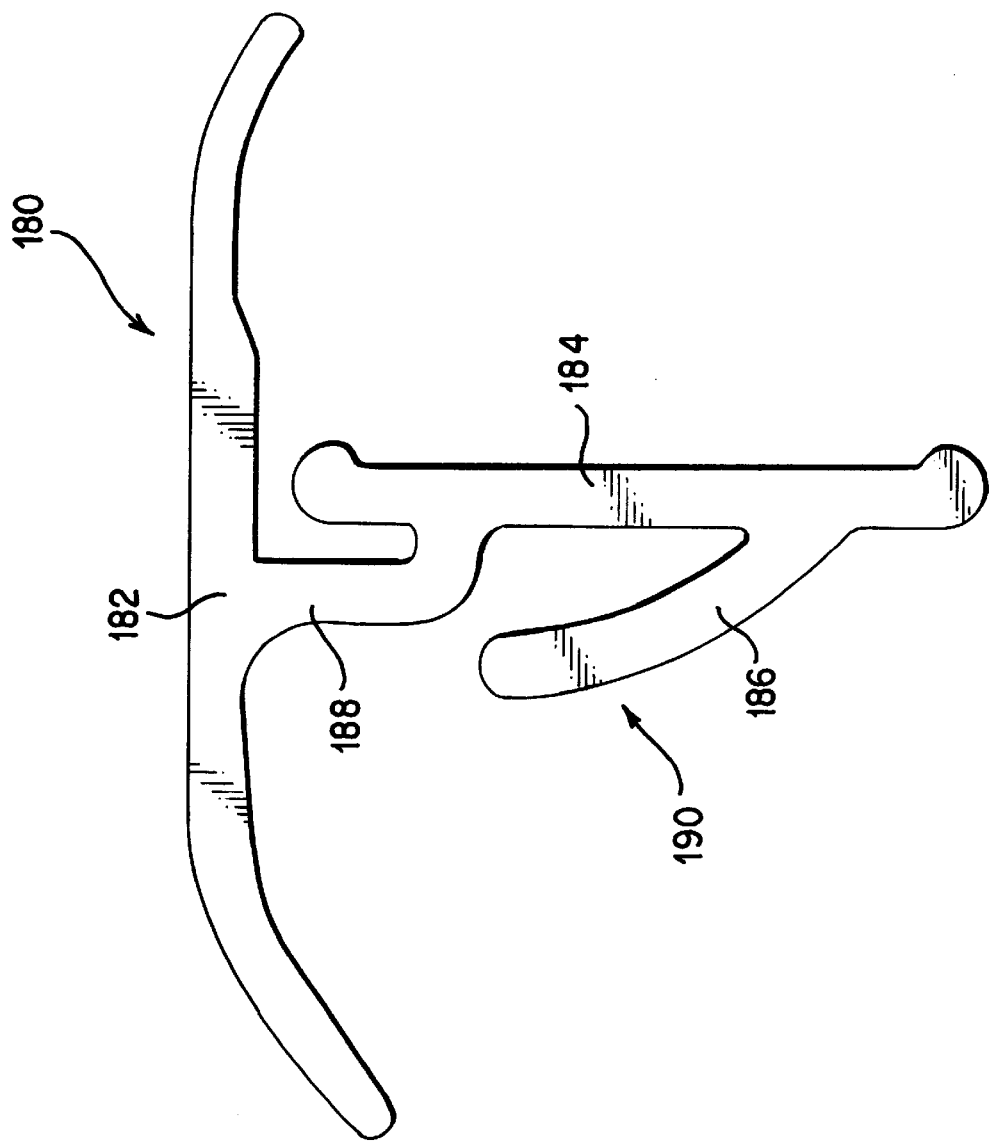
FIG. 14 is an exploded side plan view of a sealing piece shown in FIGS. 11a and 11b.

FIG. 14 shows a preferred embodiment of the sealing piece 180 in accordance with the second embodiment of the present invention. In preferred embodiments, the sealing pieces 180 extend along the lengths of the side edges and the rear side edge of the panel structure 56. In alternative embodiments, the sealing pieces may also be used as the side molding pieces. In one embodiment, the sealing piece 180 is made of rubber. However, in alternative embodiments, the sealing piece 180 may be made of other suitable materials, such as plastic, ceramic, metal, composites, or the like. In the illustrated embodiment, the sealing piece 180 has a horizontal leg 182 and a generally hook-shaped vertical leg 190. The vertical leg 190 is defined by a central leg 188, a hook base 184, and a hook finger 186.

Figure 11A:
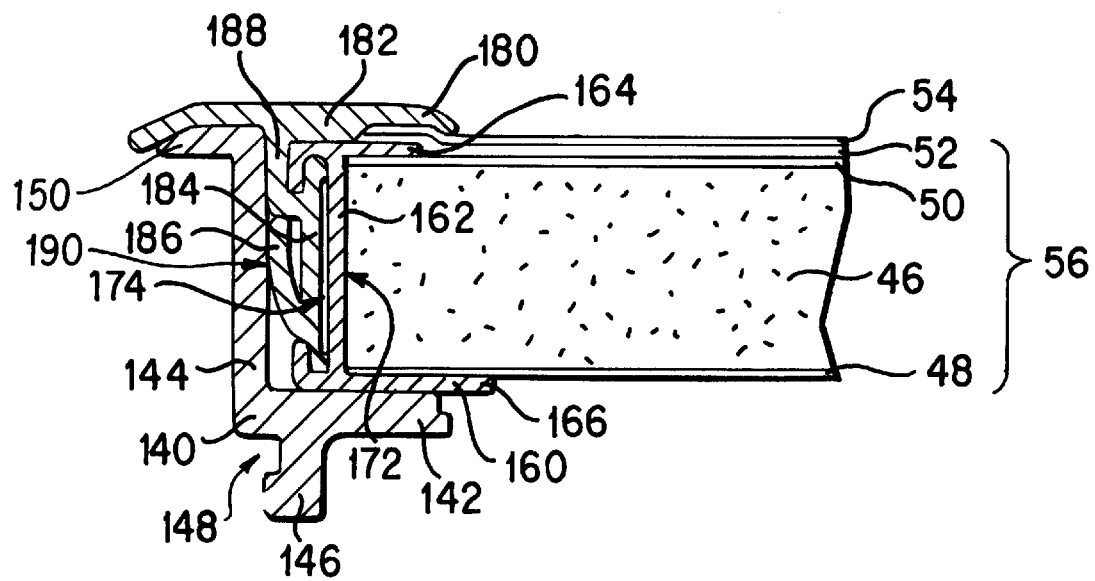
FIGS. 11a and 11b are cross-section views of a portion of the cover in accordance with a second embodiment of the present invention.
Figure 11B:
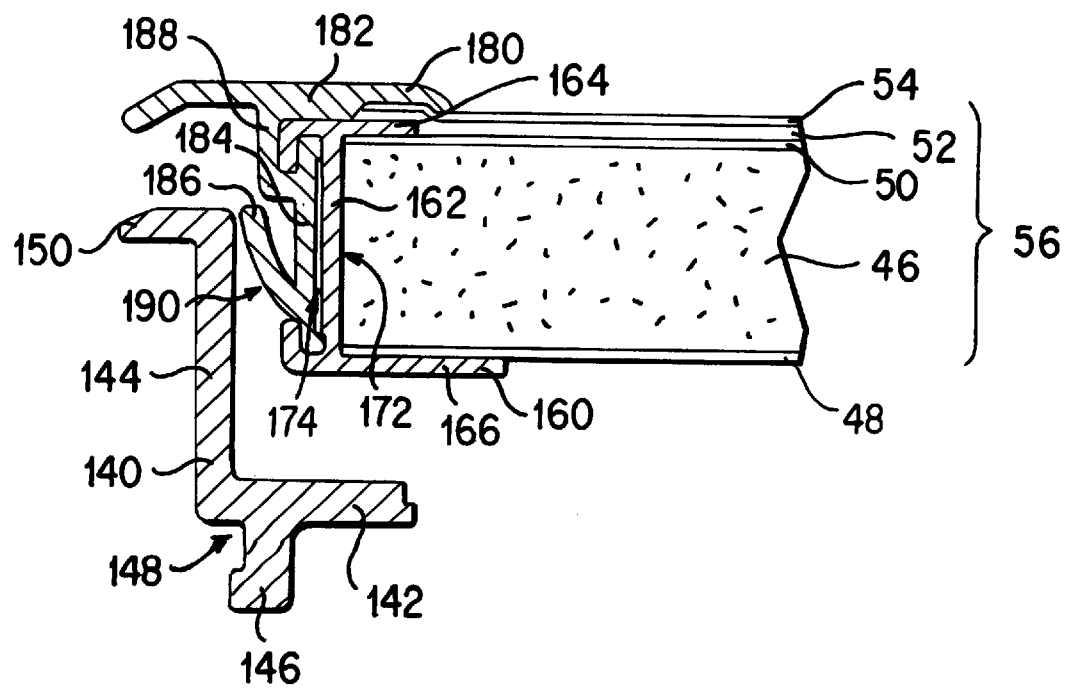

In preferred embodiments, the sealing pieces 180 are secured to the side brackets 160. In one embodiment, the side molding pieces 60 are omitted from, and the sealing pieces 180 are secured to, the side brackets 160 along the side edges and the rear side edge of the panel structure 56. In alternative embodiments, the sealing pieces may also be used as the side molding pieces. Referring to FIGS. 11a and 11b, the sealing piece 180 is adapted to mate with, and thus be secured to, the bracket 160. Specifically, the hook base 184 of the sealing piece 180 mates with the "C"-shaped bracket portion 174 of the bracket 160. Because the sealing piece 180 is made from flexible material, the hook finger 186 is able to move laterally in a direction perpendicular to the hook base 184. A portion of the horizontal leg 182 of the sealing piece 180 is disposed above and partially overlaps the upper leg 164 of the bracket 160, the padding sheet 52, and the protective layer 54. The sealing piece 180 thus partially hides the bracket 160 from view and protects the bracket 160 from environmental elements.

Figure 1:
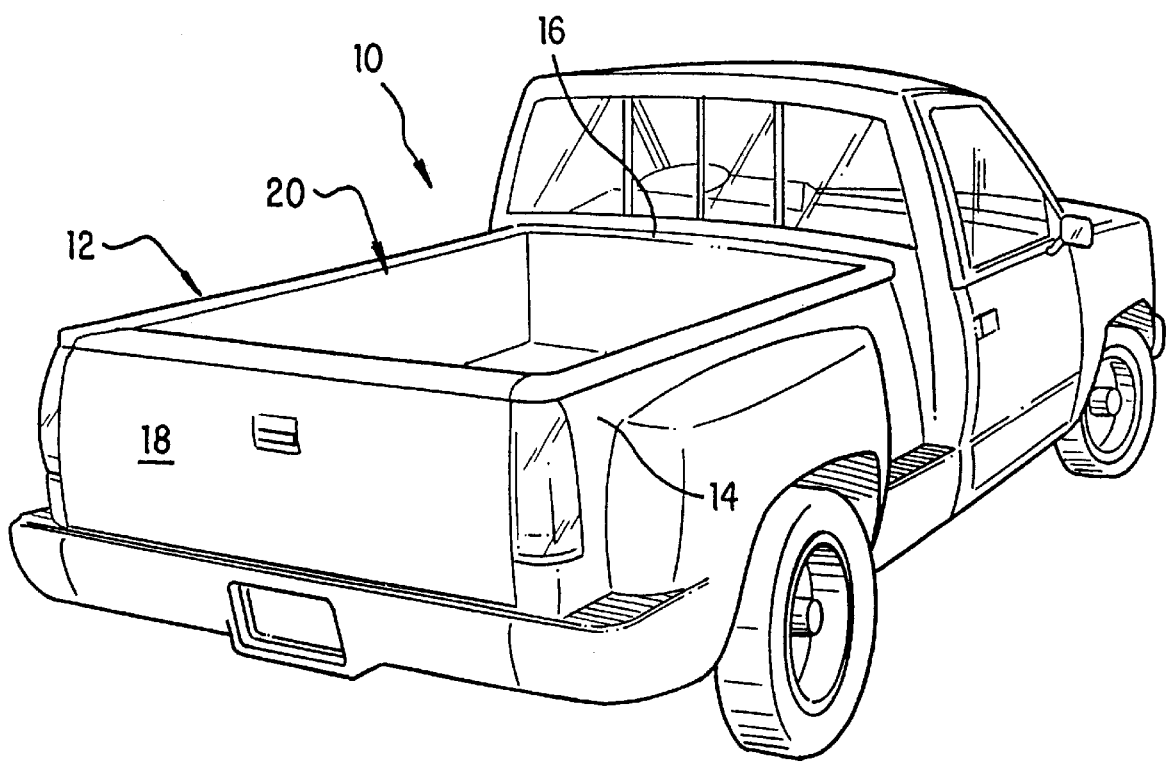
FIG. 1 is a perspective view of a conventional pickup truck, without a cover over the truck bed.

FIGS. 11a and 11b illustrate the sealing system along the side walls 12 and 14 of the truck bed in accordance with the second embodiment of the present invention. Referring to FIG. 11a, when the panel structure 56 is in the closed position, the bracket 160 and the panel structure 56 rest on the horizontal leg 142 of the side ledge 140. A portion of the horizontal leg 182 of the sealing piece 180 is disposed above and overlaps the head portion 150 of the side ledge 140. The vertical leg 190 of the sealing piece 180 is disposed between the bracket 160 and the vertical leg 144 of the side ledge 140. Specifically, the hook finger 186 of the sealing piece 180 is urged against the vertical leg 144 of the side ledge 140, thus pressing the hook finger 186 toward the hook base 184 to form a substantially continguous surface with the central leg 188 of the sealing piece 180. A seal against environmental elements along the side walls 12 and 14 of the truck bed 10 is thus formed. In alternative embodiments, the side ledges 140 may be omitted from the side walls 12 and 14, and the sealing pieces 180 may be disposed between the brackets 160 and the side walls 12 and 14. Referring to FIG. 1 lb, when the panel structure 56 is in the open position, the sealing piece 180, the bracket 160, and the panel structure 56 are inclined relative to the horizontal leg 142 of the side ledge 140, and the hook finger 186 protrudes from the hook base 184.

The sealing system along the tailgate 18 of the truck bed 10 is similar to the sealing system along the side walls 12 and 14 shown in FIGS. 11a and 11b, except that the side ledge 140 is omitted along the tailgate 18. The sealing piece 180 is thus disposed between the bracket 160 and the tailgate 18. In alternative embodiments, the side ledge 140 may be secured to the tailgate 18 so that the sealing piece 180 is disposed between the bracket 160 and the side ledge 140.

In the embodiment illustrated in FIGS. 11a, 11b, and 14, the sealing piece 180 has the moveable hook finger 186. In alternative embodiments, the hook finger 186 may have other structures, such as a bulb-shaped structure or the like. However, the finger 186 is preferred because it exerts less pressure on the base 184 and is thus less likely to stick when pressure on the finger 186 is relieved.

Figure 15A:
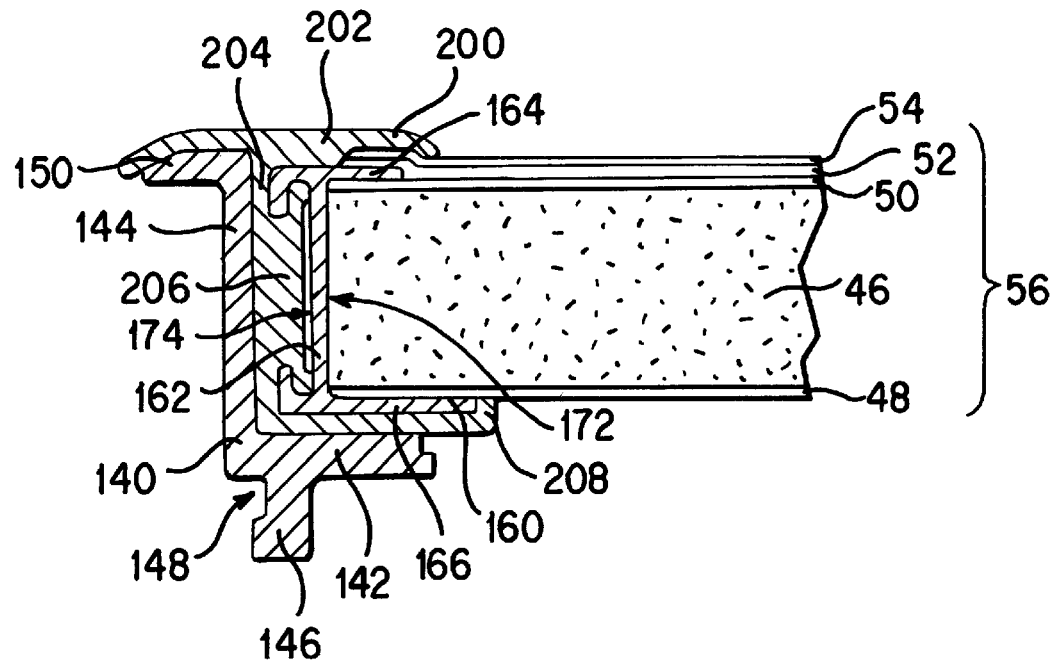
FIGS. 15a and 15b are cross-section views of a portion of the cover in accordance with a third embodiment of the present invention.
Figure 15B:
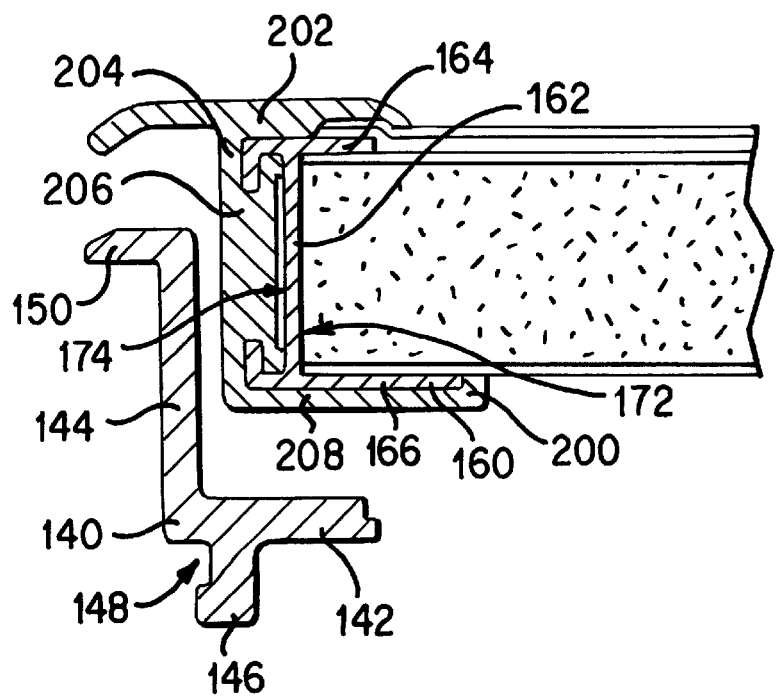

FIGS. 15a and 15b illustrate an alternative embodiment of the sealing system shown in FIGS. 11a and 11b, in accordance with a third embodiment of the present invention. In particular, FIGS. 15a and 15b show an alternative embodiment of the sealing piece 180 shown in FIGS. 11a and 11b. Referring to FIGS. 15a and 15b, the sealing piece 200 is defined by upper and lower legs 202 and 208, respectively, and first and second central legs 204 and 206, respectively. The first and second central legs 204 and 206 of the sealing piece 200 mate with the "C"-shaped bracket portion 174 of the bracket 160. A portion of the upper leg 202 of the sealing piece 200 is disposed above and partially overlaps the upper leg 164 of the bracket 160, the padding sheet 52, and the protective layer 54. The lower leg 208 of the sealing piece 200 is disposed under and overlaps the lower leg 166 of the bracket 160.

FIGS. 15a and 15b illustrate the sealing system along the side walls 12 and 14 of the truck bed in accordance with the third embodiment of the present invention. Referring to FIG. 15a, when the panel structure 56 is in the closed position, the bracket 160 and the panel structure 56 rest on the horizontal leg 142 of the side ledge 140. A portion of the upper leg 202 of the sealing piece 200 is disposed above and overlaps the head portion 150 of the side ledge 140. In alternative embodiments, this portion of the upper leg 202 of the sealing piece 200 may be omitted to define a generally "U"-shaped sealing piece 200. The first and second central legs 204 and 206 of the sealing piece 200 are disposed between the bracket 160 and the vertical leg 144 of the side ledge 140. A seal against environmental elements along the side walls 12 and 14 of the truck bed 10 is thus formed. Referring to FIG. 15b, when the panel structure 56 is in the open position, the sealing piece 200, the bracket 160, and the panel structure 56 are inclined relative to the horizontal leg 142 of the side ledge 140.

Therefore, according to embodiments described above, a hard shell tonneau cover 30 is provided for covering the bed 10 of a pickup truck or for other suitable applications. The composite layered panel structure 56 may be formed with any suitable dimensions, depending upon the application of use. For example, the panel structure 56 may be readily cut or assembled in suitable sizes to fit a variety of truck beds.

In accordance with a first embodiment of the present invention, the brackets 58 and side molding pieces 60 are configured to function with a variety of truck bed dimensions and allow the cover 30 to be readily adapted to a variety of truck models and makes. The curvature of the side molding piece 60 tends to provide an aesthetically pleasing transition between the cover 30 and the truck side walls 12 and 14, for a variety of side wall taper angles a.

The rigidity of the panel structure 56 and the support mechanisms (e.g., struts 34 and 36) allow the cover 30 to be readily disposed in an open position (as shown in FIG. 3) for easy access to the interior 20 of the bed 10. The latches 36 and 40 and latch engaging members 42 and 44 are accessible only from the interior 20 of the bed 10 when the cover 30 is in the closed position (FIG. 2). Furthermore, the cover 30 does not attach to or interfere with the tailgate 18 of the truck bed 10, such that the tailgate 18 may be opened and closed, while the cover 30 is in the closed position (FIG. 2).

In accordance with second and third embodiments of the present invention, the hinge 120 is disposed between the front side edge of the cover 30 and the front wall 16 of the truck bed 10. The hinge 120 controls movement of the cover 30 between the closed position and the open position and supports the cover 30 in the open position at about the top plane of the truck bed 10. The hinge 120 also provides a seal against environmental elements along the front wall 16 of the bed 10. Additionally, a sealing system, including side ledges 140, side brackets 160, and sealing pieces 180 or 200, is provided between the side edges of the cover 30 and the side walls 12 and 14 of the truck bed 10, as well as between the rear side edge of the cover 30 and the tailgate 18 of the bed 10. The sealing system provides a seal against environmental elements along the side walls 12 and 14 and the tailgate 18. These features, as well as other features that will be readily apparent from the above disclosure, provide a convenient, aesthetically pleasing, aerodynamic cover 30 for the bed 10 of a pickup truck or the like.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. A cover for a pickup truck bed having front, side, and rear walls and a bed interior, the cover comprising:
    a panel structure defining a generally flat panel with side edges;
    a plurality of side brackets, each side bracket secured to a respective side edge of the flat panel, each side bracket having a bottom surface adapted to be disposed adjacent the top edge of the truck bed walls;
    a plurality of side molding pieces, each side molding piece secured to a respective side bracket; and
    a hinge coupled to the flat panel for moving the panel structure between closed and open positions and for supporting the panel structure in the open position at about the top plane of the truck bed.

2. The cover of claim 1, wherein the hinge is coupled to the flat panel and a portion of the truck bed adjacent the front wall of the truck bed.

3. The cover of claim 2, wherein the truck bed has a rail along the front wall thereof, and wherein one end of the hinge is secured to the flat panel and the other end of the hinge couples with the rail along the front wall of the truck bed such that the panel structure can be moved between the closed and open positions.

4. The cover of claim 1, further comprising a sealing system coupled to the flat panel and the walls of the truck bed for providing a seal against environmental elements along the walls of the truck bed.

5. The cover of claim 4, wherein the sealing system comprises a plurality of side ledges, each side ledge secured to a respective wall of the truck bed, wherein each side molding piece urges against a respective side ledge to form a seal along the walls of the truck bed.

6. A cover for a pickup truck bed having a front wall, the cover comprising:
    a generally rigid panel structure defining front, side, and rear edges; and
    a hinge disposed between the front edge of the panel structure and the front wall of the truck bed for moving the panel structure between closed and open positions and for supporting the panel structure in the open position at about the top plane of the truck bed, wherein the hinge longitudinally extends from one side edge of the panel structure to the other side edge of the panel structure.

7. The cover of claim 6, wherein the truck bed has a rail along the front wall thereof, and wherein one end of the hinge is secured to the front edge of the panel structure and the other end of the hinge has a socket for engaging the rail along the front wall of the truck bed such that the panel structure can be moved between the closed and open positions.

8. A cover for a pickup truck bed having walls, the cover comprising:
    a generally rigid panel structure defining top, side, and bottom edges; and
    a sealing system disposed between the top, side, and bottom edges of the panel structure and the walls of the truck bed for providing a triple seal against environmental elements along the walls of the truck bed.

9. The cover of claim 8, wherein the sealing system comprises:
    a plurality of side brackets, each side bracket secured to a respective side edge of the panel structure;
    a plurality of sealing pieces, each sealing piece secured to a respective side bracket; and
    a plurality of side ledges, each side ledge secured to a respective wall of the truck bed, wherein each side bracket and each sealing piece urge against a respective side ledge to provide the triple seal against environmental elements.

* * * * *